United States Patent
Davis et al.

(10) Patent No.: US 6,311,557 B1
(45) Date of Patent: Nov. 6, 2001

(54) MAGNETICALLY TUNABLE RESONANCE FREQUENCY BEAM UTILIZING A STRESS-SENSITIVE FILM

(75) Inventors: J. Kenneth Davis, Kingston; Thomas G. Thundat, Knoxville; Eric A. Wachter, Oak Ridge, all of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/405,461

(22) Filed: Sep. 24, 1999

(51) Int. Cl.$^7$ ........................... G01P 15/08
(52) U.S. Cl. .............. 73/514.31; 324/207.13; 324/209
(58) Field of Search .............. 73/514.31, 514.35, 73/514.36; 324/200, 207.11, 207.12, 207.13, 207.16, 207.21, 209, 244, 249, 252, 259

(56) References Cited

U.S. PATENT DOCUMENTS

| | | | |
|---|---|---|---|
| 4,955,238 | * | 9/1990 | Jones et al. ........................... 73/800 |
| 5,004,914 | * | 4/1991 | Vali et al. ........................ 250/227.27 |
| 5,027,657 | * | 7/1991 | Juckenack et al. .............. 73/514.31 |
| 5,442,288 | * | 8/1995 | Fenn et al. ........................... 324/244 |
| 5,589,770 | * | 12/1996 | Saitou .................................. 324/209 |
| 5,719,324 | | 2/1998 | Thundat . |
| 5,807,758 | * | 9/1998 | Lee et al. ............................ 436/526 |
| 5,918,263 | | 6/1999 | Thundat . |

OTHER PUBLICATIONS

G. Y. Chen, et al "Adsorption–Induced Surface Stress & Its Effects on Resonance Frequency of Microcaltilevers" J.Appl.Phys. 77 (8), Apr. 1995, 1–5.

M. Ilavsky et al, Responsive Gels: Volume Transitions I Editor: K. Dusek, 1993.

* cited by examiner

Primary Examiner—Richard A. Moller
(74) Attorney, Agent, or Firm—Joseph A. Marasco

(57) ABSTRACT

Methods and apparatus for detecting particular frequencies of vibration utilize a magnetically-tunable beam element having a stress-sensitive coating and means for providing magnetic force to controllably deflect the beam element thereby changing its stiffness and its resonance frequency. It is then determined from the response of the magnetically-tunable beam element to the vibration to which the beam is exposed whether or not a particular frequency or frequencies of vibration are detected.

27 Claims, 4 Drawing Sheets

MAGNETICALLY TUNABLE RESONANCE FREQUENCY BEAM UTILIZING A STRESS-SENSITIVE FILM

CROSS-REFERENCE TO RELATED APPLICATIONS

The invention herein described and claimed relates to U.S. patent application Ser. No. 09/404,954 entitled Electrostatically Tunable Resonance Frequency Beam Utilizing A Stress-Sensitive Film by T. G. Thundat et al., filed on even date herewith, the entire disclosure of which is incorporated herein by reference.

The invention herein described and claimed relates to U.S. patent application Ser. No. 09/405,924 entitled Piezoelectrically Tunable Resonance Frequency Beam Utilizing A Stress-Sensitive Film by T. G. Thundat et al., filed on even date herewith, the entire disclosure of which is incorporated herein by reference.

The United States Government has rights in this invention pursuant to contract no. DE-AC05-96OR22464 between the United States Department of Energy and Lockheed Martin Energy Research Corporation.

FIELD OF THE INVENTION

The present invention relates to methods and apparatus for detecting particular frequencies of vibration, and especially for detecting and selecting particular frequencies of vibration using detection and selection apparatus comprising magnetically-tunable beam members such as cantilevers and very small cantilevers, often called microcantilevers.

BACKGROUND OF THE INVENTION

The resonance frequencies of a beam occur at discrete values based on the geometrical and mechanical properties of the beam and the environment in which it is located. The efficiency of resonance is measured by the quality factor (or Q-factor), where large Q-factors correspond to high efficiency. High-Q beams such as cantilever beams can be used as efficient listening devices for particular frequencies, with much higher sensitivity and specificity for particular acoustic bands of interest in comparison to conventional acoustic transducers. Moreover, microcantilevers, which are only a few hundred microns in length, are also much more simple to produce and could be far smaller in comparison to standard microphone technologies. Unfortunately, as an inevitable consequence of their high specificity, one would need an exorbitant number of fixed-frequency cantilevers to cover a broad frequency spectrum. Because of this simple reason cantilever-based listening devices have not attracted significant attention. Thus, it is desirable to make a high-Q cantilever that use a magnetic method to achieve broad frequency tunability. The resonance frequency of such a cantilever might be changed by varying a magnetic field and thereby varying magnetic attraction or repulsion (hereinafter referred to as magnetic force) acting upon the cantilever. The magnetic field might be produced by a permanent magnet or an electromagnet or combination thereof.

OBJECTS OF THE INVENTION

Accordingly, it is an object of the present invention to provide a new and improved method and apparatus for tuning the resonance frequency of a beam such as a cantilever element, and more specifically to provide a new method and apparatus for tuning the resonance frequency of a beam such as a cantilever element by varying a magnetic field applied to the beam and/or its environment.

Further and other objects of the present invention will become apparent from the description contained herein.

SUMMARY OF THE INVENTION

In accordance with one aspect of the present invention, the foregoing and other objects are achieved by a magnetically-tunable beam for detecting a particular frequency of vibration which comprises: a beam element having an end and a surface, and being fixedly disposed on the end; a stress-sensitive means for controlling stiffness of the beam selected from the group consisting of: a stress sensitive coating having a stiffness that varies with the stress therein affixed on the surface of the beam element and the beam element material having a stiffness that varies with the stress therein; a first ferromagnetic means for exhibiting magnetic polarity from the group consisting of: a ferromagnetic coating disposed on a surface of the beam element and a ferromagnetic property of the beam element material; a second ferromagnetic means for exhibiting magnetic polarity fixedly disposed generally parallel to the first ferromagnetic means and separated from the first ferromagnetic means by a gap formed therebetween; magnetic field means suitably disposed and connected for providing magnetic polarity upon the first ferromagnetic means and the second ferromagnetic means to cause magnetic force between the first ferromagnetic means and the second ferromagnetic means so that magnetic force therebetween causes the beam element to bend, and thus produces a change in stress in the stress-sensitive means and a change in the resonance frequency of the magnetically-tunable beam.

In accordance with a second aspect of the present invention, the foregoing and other objects are achieved by a method for detecting a particular frequency of vibration in an environment, wherein the method comprises the steps of providing a magnetically-tunable beam comprising a beam element having an end and a surface and being fixedly disposed on the end; a stress-sensitive means for controlling stiffness of the beam selected from the group consisting of: a stress sensitive coating having a stiffness that varies with the stress therein affixed on the surface of the beam element and the beam element material having a stiffness that varies with the stress therein; a first ferromagnetic means for exhibiting magnetic polarity selected from the group consisting of: a ferromagnetic coating disposed on a surface of the beam element and a ferromagnetic property of the beam element material; a second ferromagnetic means for exhibiting magnetic polarity fixedly disposed generally parallel to the first ferromagnetic means and separated from the first ferromagnetic means by a gap formed therebetween; and magnetic field means suitably disposed and connected for providing magnetic polarity upon the first ferromagnetic means and the second ferromagnetic means; exposing the beam element to the environment; activating the magnetic field means to cause magnetic force between the first ferromagnetic means and the second ferromagnetic means so that magnetic force therebetween causes the beam element to bend and thus produces a change in stress in the stress-sensitive means and a change in the resonance frequency of the magnetically-tunable beam to permit the magnetically-tunable beam to respond resonantly at the particular frequency; and determining from the resonance response of the magnetically-tunable beam whether the particular frequency of vibration is detected.

In accordance with a third aspect of the present invention, the foregoing and other objects are achieved by a method for selecting a desired frequency of vibration from a mixture of frequencies which comprises the steps of: providing a magnetically-tunable beam comprising a beam element having an end and a surface, and being fixedly disposed on the end; a stress-sensitive means for controlling stiffness of the beam selected from the group consisting of: a stress sensitive coating having a stiffness that varies with the stress therein affixed on the surface of the beam element and the beam element material having a stiffness that varies with the stress therein; a first ferromagnetic means for exhibiting magnetic polarity selected from the group consisting of: a ferromagnetic property disposed on a surface of the beam element and a ferromagnetic property of the beam element material; a second ferromagnetic means for exhibiting magnetic polarity fixedly disposed generally parallel to the first electrical conductor means and separated from the first electrical conductor means by a gap formed therebetween; and magnetic field means suitably disposed and connected for providing magnetic polarity upon the first ferromagnetic means and the second ferromagnetic means; activating the magnetic field means to cause magnetic force between the first ferromagnetic means and the second ferromagnetic means so that magnetic force therebetween causes the beam element to bend and thus produces a change in stress in the stress-sensitive means and a change in the resonance frequency of the magnetically-tunable beam to establish the resonance frequency of the magnetically-tunable beam at the desired frequency; and exposing the magnetically-tunable beam to the mixture of frequencies to excite the magnetically-tunable beam to vibrate at a desired resonance frequency whereby the particular frequency desired is selected out of the mixture of frequencies.

Figure 1A:
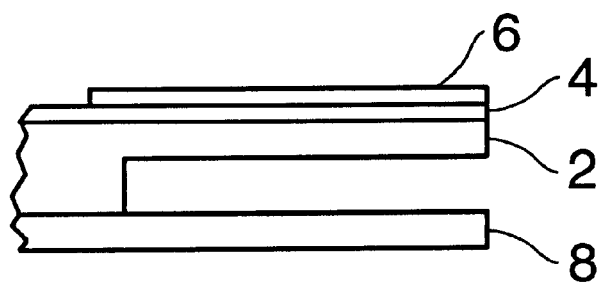
FIGS. 1a, 1b, and 1c show a preferred method for varying cantilever resonance frequency wherein a ferromagnetic coating is applied to the cantilever.

For a better understanding of the present invention, together with other and further objects, advantages and capabilities thereof, reference is made to the following disclosure and appended claims in connection with the above-described drawings.

DETAILED DESCRIPTION OF THE INVENTION

The claimed invention is based on the concept of changing the resonance frequency of a cantilever by changing its stiffness. The resonance frequency, $v$, of an oscillating cantilever can be expressed as $$v = \frac{1}{2\pi}\sqrt{\frac{K}{m^*}} \quad (1)$$

where K is the stiffness and $m^*$ is the effective mass of the cantilever. Note that $m^*=nm_b$, where $m_b$ is the mass of the cantilever beam and the value of n is about 0.24 for a rectangular cantilever.

There are several approaches by which the resonance frequency of a cantilever can be varied. The approach described herein involves the application of a stress sensitive film to the cantilever surface. Young's Modulus for many polymers varies with applied stress due to changes in bond length of the constituent molecules.

If the cantilever is coated with or comprises a stress-sensitive material, the stiffness can be changed by bending the cantilever. The stress-sensitive material may preferably be selected from but not limited to the group consisting of metals, metal alloys, dielectric materials, polymeric materials and combinations thereof. Specific examples of such polymeric materials include but are not limited to such polymers as polycarbonate of visphenol, poly[N,N'-(p,p'-oxydiphenylene) pyromellitimide], poly(vinyl chloride), and the like. Many other polymers are known to the skilled artisan which perform as described herein. This bending can be easily effected by magnetic means. When the length of the cantilever is much larger than the width, Hooke's Law for small deflections relating the curvature with effective modulus, Y, and moment, M, is given by $$\frac{d^2z}{dy^2} = \frac{M}{YI} \quad (2)$$

where $d^2z/dy^2$ represents I, y represents distance, and z represents deflection.

The effective modulus Y in isotropic elasticity is $E/(1-v)$ where E is Young's Modulus and U is Poisson's ratio for the substrate. For rectangular cantilevers, the area moment of inertia I is given by $Wt^3/12$, where W is the width and t is the thickness. The moment due to stress $\delta s$ is given as $\delta s$ Wt/2. Using the moment equation 2 can be written in the form of Stoney's formula as $$\frac{1}{R} = \frac{6(1-v)\delta s}{Et^2} \quad (3)$$

where the reciprocal of the radius of curvature, R, equals $d^2z/dy^2$. The displacement and surface stress are related by Equation 2. Taking into account the boundary conditions of a cantilever, Equation 2 can be solved and the displacement of the cantilever, z, can be written as $$z = \left[\frac{3(1-v)L}{t^2E}\right]\delta s \quad (4)$$

where L is the length of the cantilever. Bending can be accomplished by magnetic deflection of the cantilever. Differential surface stress, $\delta s$, induced in the cantilever or in a stress-sensitive coating located on the surface of the cantilever changes the effective rigidity of the cantilever, resulting in a shift in stiffness from K to $(K+\delta K)$ Therefore Equation 1 can be rewritten as $$v_2 = \frac{1}{2\pi}\sqrt{\frac{K+\delta K}{m^*}} \quad (5)$$

where the initial resonance frequency $v_1$ changes to $v_2$ due to surface stress. By using stress-sensitive materials in or on the cantilever, large values of $\delta K$ can be obtained for small changes in surface stress.

Figure 1B:
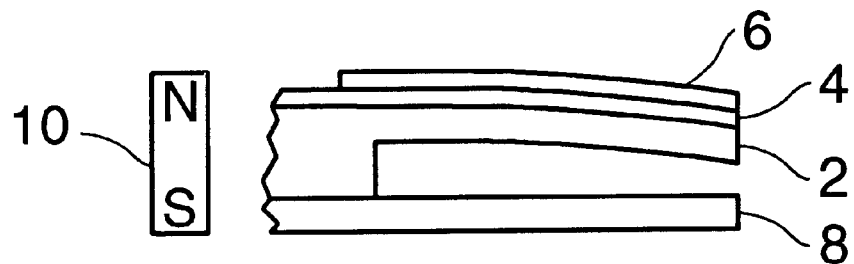

A preferred method for varying cantilever resonance frequency is shown in FIGS. 1a and 1b, which represent side views of a magnetically-tunable cantilever. In FIG. 1a, a cantilever 2 has a ferromagnetic coating 4 and a stress-sensitive coating 6 applied to one surface. The ferromagnetic coating on the cantilever is separated from a second ferromagnetic element 8 by a gap formed between the second ferromagnetic element 8 and the cantilever 2. The cantilever 2 may consist of any of a number of dielectric materials, such as silicon nitride or silicon dioxide, while the ferromagnetic elements 4 and 8 may preferably be composed of metals such as iron or nickel or some other ferromagnetic material. A magnetic field may be applied across the gap formed between the elements 4 and 8 by placing a permanent magnet 10 in a position to induce magnetic polarity within the ferromagnetic coating on the cantilever and within the ferromagnetic element 4; or by activating an electromagnet (not shown) to induce magnetic polarity within the ferromagnetic coating on the cantilever and within the ferromagnetic element 4. When the magnetic field is applied (FIGS. 1b, 1c), magnetic force between the two ferromagnetic elements causes the cantilever to bend, producing a change in stress in coating 6 that results in a change in stiffness and concomitant change in resonance frequency. The magnitude of the change in resonance frequency is controlled by the extent of the bending, which is in turn controlled by the magnitude of the applied magnetic field.

In FIGS. 1a and 1b, opposite-polarity magnetic polarities are applied via magnet 10 to elements 4 and 8 to cause an electrostatic attraction therebetween. In the case of opposite-polarity potentials, elements 4 and 8 are preferably magnetically insulated from each other.

Figure 1C:
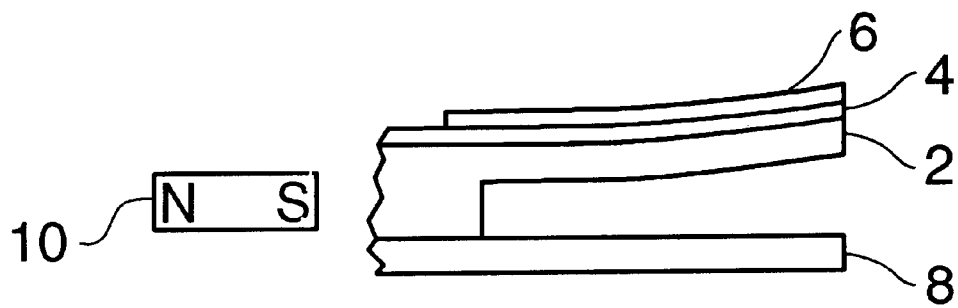

In FIG. 1c, like magnetic polarities may be applied to elements 4 and 8 to cause a magnetic repulsion therebetween. In such an embodiment magnetic insulation between 4 and 8 may not be necessary.

Figure 2A:
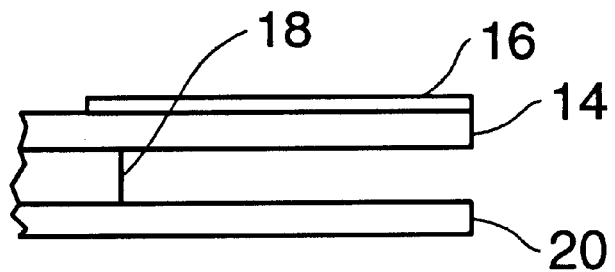
FIGS. 2a, 2b, and 2c show an alternate design for a cantilever assembly wherein the cantilever itself comprises a ferromagnetic material.
Figure 2B:
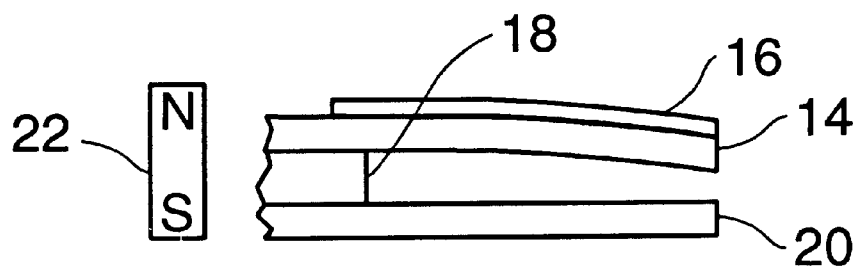
Figure 2C:
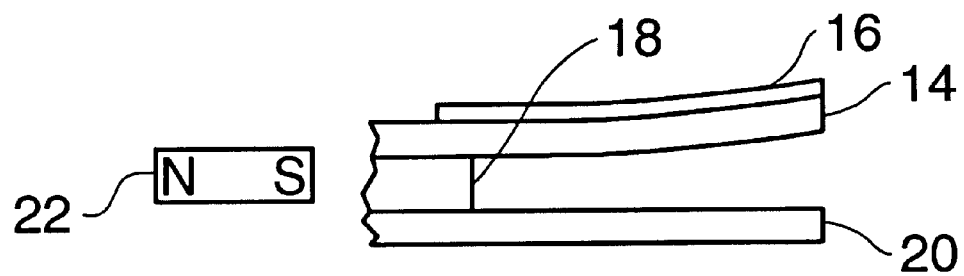

Another alternative embodiment for the cantilever assembly is shown in FIGS. 2a, 2b, and 2c. Here, the cantilever itself 14 is composed of a ferromagnetic material, with a stress-sensitive coating 16 applied to one side. An insulating spacer layer 18 separates the ferromagnetic cantilever 14 from a second ferromagnetic element 20. A magnetic field is applied via magnet 22 which causes magnetic polarity in the two elements 14 and 20 as described above.

Figure 3A:
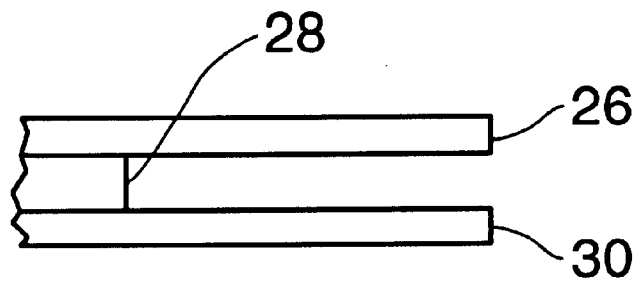
FIGS. 3a, 3b, and 3c show a cantilever beam comprising a material that exhibits an intrinsic change in stiffness upon bending.
Figure 3B:
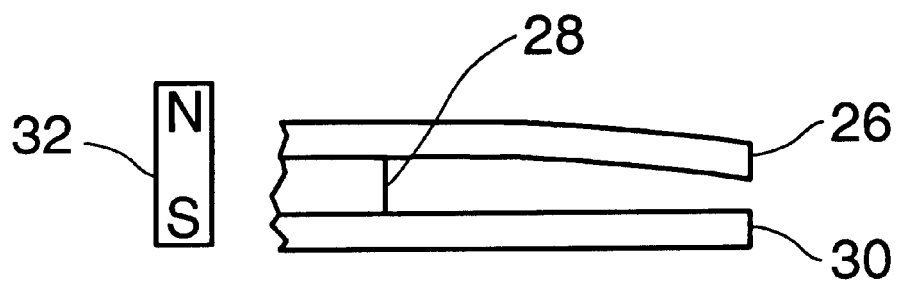
Figure 3C:
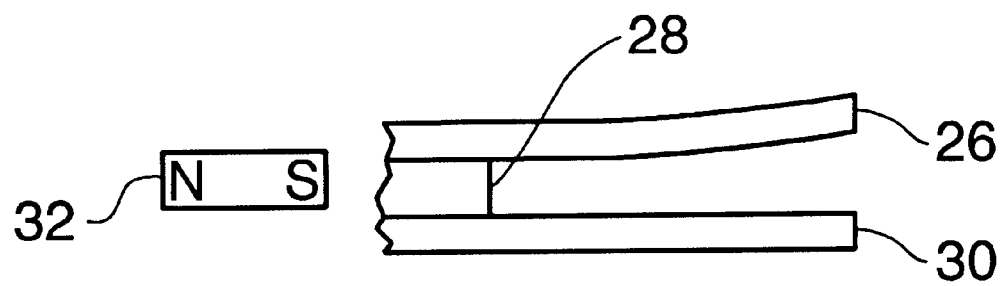

Yet another alternative embodimnent shown in FIGS. 3a, 3b, and 3c uses a cantilever beam composed of a material that exhibits an intrinsic change in stiffness upon bending. A ferromagnetic cantilever 26 is separated by an insulating layer 28 from a second ferromagnetic element 30. Imposition of a magnetic field via a magnet 32 to the elements 26 and 30 as described above causes the cantilever to bend, resulting in a change in stress, stiffness, and hence resonance frequency. A means for varying the magnetic field may be used to control the resonance frequency of the cantilever as a function of time.

Figure 4:
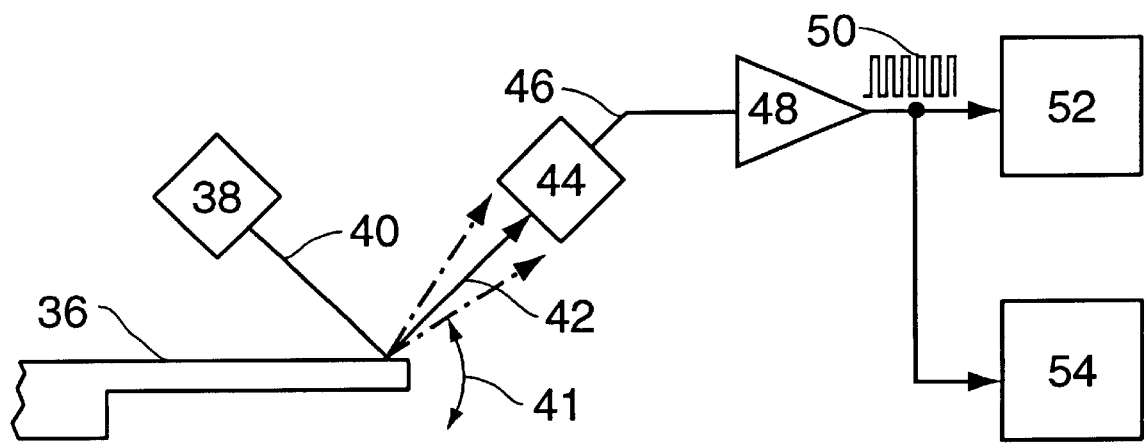
FIG. 4 shows an example of an optical detection method.

The tuning range available to an individual cantilever as described herein will depend on the initial stiffness of the cantilever beam, the extent of bending exerted on the beam, and the change in stress for the stress sensitive material. To effect high sensitivity detection of acoustic energy, the cantilever is magnetically tuned to the appropriate resonance frequency, where it will respond by vibrating in resonance with the acoustic signal. This vibration can be detected by any of several common means, including optical detection of cantilever deflection, changes in piezoelectricity of coatings applied to the cantilever, capacitance variation between the cantilever and a fixed surface, piezoresistance of cantilever beam, or changes in tunneling current or capacitance between the cantilever and a stationary electrode. These methods are all well-known to the artisan skilled in atomic force microscopy for sensitive detection of cantilever deflection. An example of the optical deflection means is shown in FIG. 4. Here, vibration of a cantilever 36 is monitored using a diode laser 38. Light 40 emitted from the laser 38 is reflected from the end of the cantilever 36. The reflected light 42 sweeps across a position sensitive photodiode 44 at the frequency of cantilever vibration. Output from the photodiode 46 is amplified by an amplifier 48 and the output signal 50 is fed into a counting circuit 52. The number of cycles per unit time observed by the counter is used to determine the frequency of vibration. The amplitude of the output signal 50 is monitored by an analog differentiation circuit 54 to determine the magnitude of the cantilever oscillation.

Figure 5:
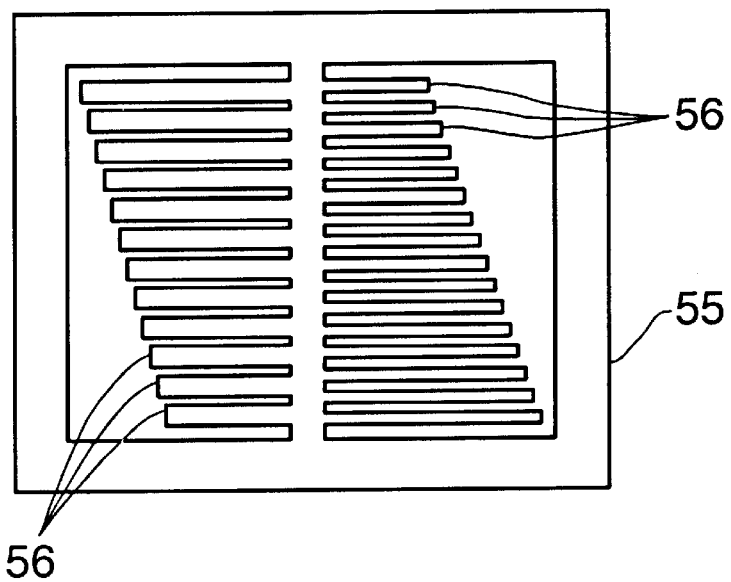
FIG. 5 shows a possible arrangement of multiple cantilevers having different geometries which can be used as an ensemble to cover an acoustic spectrum.

To detect a broad range of frequencies, it may be desirable to use an array of cantilevers, each element of which is individually tuned for optimal response over a portion of the total acoustic range. A possible configuration is shown in FIG. 5, where cantilevers having different geometries 56 are used as an ensemble to cover an acoustic spectrum. Each element may be tuned during manufacture to assure the preferred response within its functional range. A possible packaging configuration for an array of cantilevers might include all readout electronics on a single monolithic device. Such a device could be manufactured using standard integrated circuit production methods, and would require the use of no additional discrete components. As such, it could be considerably smaller, less expensive, and more rugged than other available acoustic monitoring technologies.

The claimed invention provides a number of advantages and features:

Tunability—The method provides a means for achieving high sensitivity and high selectivity through the use of tunable, high-Q resonance frequency.

Simplicity—Resonance frequency is inherently simple to measure, and the small devices can be manufactured in arrays having desired acoustic response characteristics.

Speed—Much faster response time (tens of $\mu s$) than conventional acoustic detectors (tens of ms) due to extremely small size and large Q value.

Sensitivity—The sensitivity can be controlled by the geometry of the cantilevers and the coating on the cantilevers. This can be made very broadband, narrow band, low pass, or high pass.

Size—Current state-of-the-art in micro-manufacturing technologies suggest that a sensor array and control electronics could be housed in a standard transistor package.

Low power consumption—The power requirements are estimated to be in sub-mW range for individual sensors allowing the use of battery or photovoltaic power.

Low cost—No exotic or expensive materials or components are needed for sensor fabrication. Electronics for operation and control are of conventional design, and are relatively simple and inexpensive.

Wide range—A wide range of the acoustic spectrum could be detected using an array of cantilevers with different initial K values.

A number of alternative embodiments are possible. The device herein before described is made of cantilever-type beams with one end free to vibrate. However, a similar device may be constructed using beams of other configurations, such as simply supported beams wherein both ends are supported, free to rotate; or beams with both ends fixed, not free to rotate; with one end fixed and one end supported and free to rotate; and other simple and compound beam structures and combinations, such as triangular beams having two corners fixed and the third corner free.

Alternative uses are also possible. For example, in addition to being used to detect particular frequencies of acoustic vibration, the apparatus may be used as a narrow band filter to select a particular frequency out of a mixture of acoustic frequencies.

Applications for the claimed invention are numerous and varied, and may include: passive listening devices for detection of concealed objects, including submarines and buried structures, location of fish schools, or detection of leaking pipelines; passive flow monitoring based on acoustic signatures of the Venturi Effect and other phenomenon; replacing microphones used to detect pending mechanical failure of machine components (for example, the gear box of helicopters, machine tools, power plant turbines, or automobile engines); detection of thermal or mechanical stress in objects or structures based on passive acoustic signatures; burglar and intrusion detectors and alarms for buildings and vehicles; simplified voice recognition systems; and cochlear implants for hearing impaired people.

While there has been shown and described what are considered the preferred embodiments of the invention, it will be obvious to those skilled in the art that various changes and modifications can be made therein without departing from the scope of the inventions defined by the appended claims.

We claim:

1. A magnetically-tunable beam for detecting a particular frequency of vibration comprising:
    a beam element having an end and a surface, and being fixedly disposed on the end;
    a stress-sensitive means for controlling stiffness of the beam selected from the group consisting of a stress sensitive coating having a stiffness that varies with the stress therein affixed on the surface of the beam element and the beam element material having a stiffness that varies with the stress therein;
    a first ferromagnetic means for exhibiting magnetic polarity from the group consisting of: a ferromagnetic coating disposed on a surface of the beam element and a ferromagnetic property of the beam element material;
    a second ferromagnetic means for exhibiting magnetic polarity fixedly disposed generally parallel to the first ferromagnetic means and separated from the first ferromagnetic means by a gap formed therebetween; and
    a magnetic field means suitably disposed and connected for providing magnetic polarity upon the first ferromagnetic means and the second ferromagnetic means to cause magnetic force between the first ferromagnetic means and the second ferromagnetic means so that magnetic force therebetween causes the beam element to bend, and thus produces a change in stress in the stress-sensitive means and a change in the resonance frequency of the magnetically-tunable beam.

2. The magnetically-tunable beam as described in claim 1 wherein the beam element comprises a cantilever beam.

3. The magnetically-tunable beam as described in claim 1 wherein the stress-sensitive coating is selected from the group consisting of metals, metal alloys, dielectric materials, polymeric materials and combinations thereof.

4. The magnetically-tunable beam as described in claim 1 wherein the stress-sensitive beam element material is selected from the group consisting of metals, metal alloys, dielectric materials, polymeric materials and combinations thereof.

5. The magnetically-tunable beam as described in claim 1 wherein the ferromagnetic coating is selected from the group consisting of nickel, alloys of nickel, iron, alloys of iron, and other materials exhibiting the characteristic of magnetism.

6. The magnetically-tunable beam as described in claim 1 further comprising detection means for detecting vibration of the beam element.

7. The magnetically-tunable beam as described in claim 6 wherein the detecting means is selected from the group consisting of optical detection means, means utilizing changes in piezoresistance of the stress sensitive means and means utilizing changes in tunneling current between the magnetically-tunable beam and a stationary electrode.

8. The magnetically-tunable beam as described in claim 1 wherein the magnetic field means is disposed and connected to provide magnetic polarity upon the first ferromagnetic means and the second ferromagnetic means in a manner to cause magnetic attraction therebetween.

9. The magnetically-tunable beam as described in claim 1 wherein the magnetic field means is disposed and connected to provide magnetic polarity upon the first ferromagnetic means and the second ferromagnetic means in a manner to cause magnetic repulsion therebetween.

10. A method for detecting a particular frequency of vibration in an environment, the method comprising the steps of:
    a. providing a magnetically-tunable beam comprising a beam element having an end and a surface and being fixedly disposed on the end; a stress-sensitive means for controlling stiffness of the beam selected from the group consisting of a stress sensitive coating having a stiffness that varies with the stress therein affixed on the surface of the beam element and the beam element material having a stiffness that varies with the stress therein; a first ferromagnetic means for exhibiting magnetic polarity selected from the group consisting of a ferromagnetic coating disposed on a surface of the beam element and a ferromagnetic property of the beam element material; a second ferromagnetic means for exhibiting magnetic polarity fixedly disposed generally parallel to the first ferromagnetic means and separated from the first ferromagnetic means by a gap formed therebetween; and magnetic field means suitably disposed and connected for providing magnetic polarity upon the first ferromagnetic means and the second ferromagnetic means;
    b. exposing the beam element to the environment;
    c. activating the magnetic field means to cause magnetic force between the first ferromagnetic means and the second ferromagnetic means so that magnetic force therebetween causes the beam element to bend and thus produces a change in stress in the stress-sensitive means and a change in the resonance frequency of the magnetically-tunable beam to permit the magnetically-tunable beam to respond resonantly at the particular frequency; and
    d. determining from the resonance response of the magnetically-tunable beam whether the particular frequency of vibration is detected.

11. The method as described in claim 10 wherein the beam element comprises a cantilever beam.

12. The method as described in claim 10 wherein the stress-sensitive coating is selected from the group consisting of metals, metal alloys, dielectric materials, polymeric materials and combinations thereof.

13. The method as described in claim 10 wherein the stress-sensitive beam element material is selected from the group consisting of metals, metal alloys, dielectric materials, polymeric materials and combinations thereof.

14. The method as described in claim 10 wherein the ferromagnetic coating is selected from the group consisting of nickel, alloys of nickel, iron, alloys of iron, and other materials exhibiting the characteristic of magnetism.

15. The method as described in claim 10 further comprising the step of utilizing means for detecting vibration of the beam element.

16. The method as described in claim 15 wherein the detecting means is selected from the group consisting of optical detection means, means utilizing changes in piezoresistance of the cantilever beam and means utilizing changes in tunneling current between the magnetically-tunable beam and a stationary electrode.

17. The method as described in claim 10 wherein the magnetic field means is disposed and connected to provide magnetic polarity upon the first ferromagnetic means and the second ferromagnetic means to cause magnetic attraction therebetween.

18. The method as described in claim 10 wherein the magnetic field means is disposed and connected to provide magnetic polarity upon the first ferromagnetic means and the second ferromagnetic means to cause magnetic repulsion therebetween.

19. A method for selecting a desired frequency of vibration from a mixture of frequencies comprising the steps of:

a. providing a magnetically-tunable beam comprising a beam element having an end and a surface, and being fixedly disposed on the end; a stress-sensitive means for controlling stiffness of the beam selected from the group consisting of: a stress sensitive coating having a stiffness that varies with the stress therein affixed on the surface of the beam element and the beam element material having a stiffness that varies with the stress therein; a first ferromagnetic means for exhibiting magnetic polarity selected from the group consisting of: a ferromagnetic property disposed on a surface of the beam element and a ferromagnetic property of the beam element material; a second ferromagnetic means for exhibiting magnetic polarity fixedly disposed generally parallel to the first electrical conductor means and separated from the first electrical conductor means by a gap formed therebetween; and magnetic field means suitably disposed and connected for providing magnetic polarity upon the first ferromagnetic means and the second ferromagnetic means;

b. activating the magnetic field means to cause magnetic force between the first ferromagnetic means and the second ferromagnetic means so that magnetic force therebetween causes the beam element to bend and thus produces a change in stress in the stress-sensitive means and a change in the resonance frequency of the magnetically-tunable beam to establish the resonance frequency of the magnetically-tunable beam at the desired frequency; and c. exposing the magnetically-tunable beam to the mixture of frequencies to excite the magnetically-tunable beam to vibrate at a desired resonance frequency whereby the particular frequency desired is selected out of the mixture of frequencies.

20. The method as described in claim 19 wherein the beam element comprises a cantilever beam.

21. The method as described in claim 19 wherein the stress-sensitive coating is selected from the group consisting of metals, metal alloys, dielectric materials, polymeric materials and combinations thereof.

22. The method as described in claim 19 wherein the stress-sensitive beam element material is selected from the group consisting of metals, metal alloys, dielectric materials, polymeric materials and combinations thereof.

23. The method as described in claim 19 wherein the ferromagnetic coating is selected from the group consisting of conductive metals and conductive alloys of metals.

24. The method as described in claim 19 further comprising the step of utilizing means for detecting vibration of the beam element.

25. The method as described in claim 24 wherein the detecting means is selected from the group consisting of optical detection means, means utilizing changes in piezoresistance of the cantilever beam and means utilizing changes in tunneling current between the magnetically-tunable beam and a stationary electrode.

26. The method as described in claim 19 wherein the magnetic field means is disposed and connected to provide magnetic polarity upon the first ferromagnetic means and the second ferromagnetic means to cause magnetic attraction therebetween.

27. The method as described in claim 19 wherein the magnetic field means is disposed and connected to provide magnetic polarity upon the first ferromagnetic means and the second ferromagnetic means to cause magnetic repulsion therebetween.

* * * * *